United States Patent [19]

Anderson

[11] 3,919,693

[45] Nov. 11, 1975

[54] ASSOCIATIVE INTERFACE FOR SINGLE BUS COMMUNICATION SYSTEM

[75] Inventor: George A. Anderson, Minneapolis, Minn.

[73] Assignee: Honeywell Inc., Minneapolis, Minn.

[22] Filed: July 26, 1974

[21] Appl. No.: 492,264

[52] U.S. Cl. .......... 340/172.5

[51] Int. Cl.$^2$ .......... G06F 15/16

[58] Field of Search . 340/172.5; 179/18 ES, 15 AL, 179/15 AQ, 15 BS

[56] References Cited

UNITED STATES PATENTS

| | | | |
|---|---|---|---|
| 3,348,210 | 10/1967 | Ochsner | 340/172.5 |
| 3,671,942 | 6/1972 | Knollman et al. | 340/172.5 |
| 3,678,467 | 7/1972 | Nussbaum et al. | 340/172.5 |
| 3,735,365 | 5/1973 | Nakamura et al. | 340/172.5 |
| 3,787,818 | 1/1974 | Arnold et al. | 340/172.5 |

*Primary Examiner*—Joseph F. Ruggiero
*Attorney, Agent, or Firm*—Molinare, Allegretti, Newitt & Witcoff

[57] ABSTRACT

The disclosure describes a data processing system including first and second receiving devices and a sending device interconnected by a common communication bus. A transmitter in the sending device transmits different types of identification signals in order to transmit data signals selectively to the first or second receiving devices. Each of the receiving devices stores a genus identification signal which is common to both devices. In addition, the first receiving device stores a first species identification signal and the second receiving device stores a second species identification signal. In order to communicate a data signal to both the first and second receiving devices, the transmitter in the sending device transmits the common genus identification signal followed by the data signal. If communication with the first receiving device alone is desired, both the genus identification signal and the first species identification signal are transmitted on the bus prior to the data signal. If communication with the second receiving device alone is desired, both the genus identification signal and the second species identification signal are transmitted on the bus prior to the data signal.

8 Claims, 5 Drawing Figures

ASSOCIATIVE INTERFACE FOR SINGLE BUS COMMUNICATION SYSTEM

The invention herein described was made in the course of or under a contract or subcontract thereunder with the United States Government, Department of the Air Force.

BACKGROUND AND SUMMARY OF THE INVENTION

This invention relates to data processing systems and more particularly relates to systems in which a sending device transmits data selectively to either one or both of two receiving devices over a common bus.

A sending device is a piece of equipment capable of transmitting digital pulses over a bus, and a receiving device is a piece of equipment capable of accepting digital data from a bus. A data processor unit having both memory and computational ability can be used as both a sending and receiving device. Sending and receiving devices can also comprise digital resource units, such as printers, card readers, or disk storage units. A resource unit is a piece of equipment capable of communicating by means of digital data with another resource unit or a processor unit.

As data processing systems have become more complicated, system designers have experimented with the concept of connecting a number of processor units or resource units together to form an integrated computing system. One of the problems impeding the development of such systems has been the lack of a versatile interconnecting technique which would enable data to be quickly distributed to the requisite units of the system.

In order to overcome the deficiencies of the prior systems, the applicant has invented a data processing technique in which each system unit is assigned to one time slot or channel time on a bus common to all units. Each unit is either a sending device, a receiving device or both. During its channel time, a sending device may send to a receiving device from 0 to N digital words. During all other channel times, the sending device remains dormant. Each receiving device receives data over the common bus from one or more sending devices. Once a sending device obtains control of the common bus, it establishes contact with the desired receiving device or devices by transmitting an identification signal before data is presented to the bus.

According to a preferred feature of the invention, each sending device of the system contains a transmitter which can communicate with first and second receiving devices located in other units through a unique system of genus and species identification signals which are stored in the first and second receiving devices. Both the first and second receiving devices store the same genus identification signal. In addition, the first receiving device stores a first species identification signal, and the second receiving device stores a second species identification signal. In order to communicate with both the first and second receiving devices, a sending device transmits the genus identification signal followed by a data signal. The first and second receiving devices recognize the genus identification signal on the bus and respond by accepting the data signal.

In order to communicate with the first receiving device alone, the sending device transmits both the genus and first species identification signals before transmitting a data signal. The first receiving device recognizes the combination of the genus and first species identification signals and accepts the data signal from the bus. The second receiving device, which stores the second species identification signal, rejects the data signal, because it is preceded by the first species identification signal. In order to communicate with the second receiving device, the sending device transmits the genus and second species identification signals on the bus before transmitting a data signal. The first receiving device, which stores the first species identification signal, rejects the data signal, because it is preceded by the second species identification signal. However, the second receiving device accepts the data signal from the bus because it is preceded by the genus and second species identification signals which are stored in the second receiving device.

According to another feature of the invention, each of the sending and receiving devices may be data processors having both memory and computational ability.

According to another feature of the invention, the sending device transmits a synchronizing signal on the bus which identifies the end of one of the identification signals and the beginning of one of the data signals.

Other more specific features of the invention are described in detail in the following description of the preferred embodiment.

The advantages of a system of the foregoing type are at once apparent to those skilled in the art. The system allows a hierarchical naming technique for identifying system units in which the name is composed of a number of sub-identification codes that sequentially describe the named unit in more-and-more detail. This technique is particularly useful in systems in which multiple processing units are employed to handle related logical functions, because the logical functions typically have hierarchical designators.

DESCRIPTION OF THE DRAWINGS

These and other advantages and features of the present invention will hereinafter appear in connection with the accompanying drawings wherein.

DESCRIPTION OF THE PREFERRED EMBODIMENT

Figure 1:
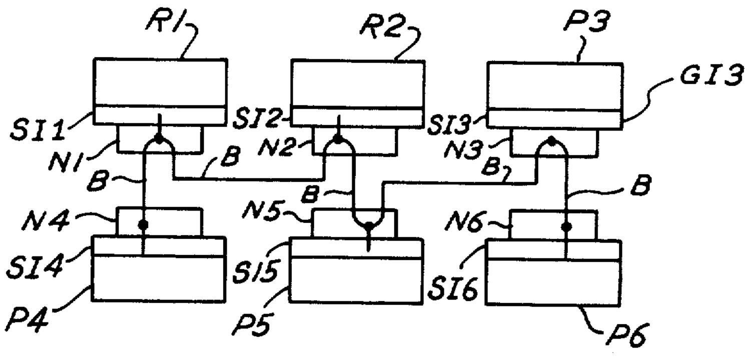
FIG. 1 is a block diagram of a preferred form of data processing system employing a single bus made in accordance with the present invention.

Referring to FIG. 1, a preferred form of data processing system made in accordance with the present invention comprises resource units R1 and R2 having interfaces SI1 and SI2 that are connected to a bus B through switching networks N1 and N2, respectively. The system also includes data processor units P3–P6 having interfaces SI3–SI6 which are connected to bus B through switching networks N3–N6, respectively. Alternatively, resource units R1 and R2 also may be processor units.

Figure 2:
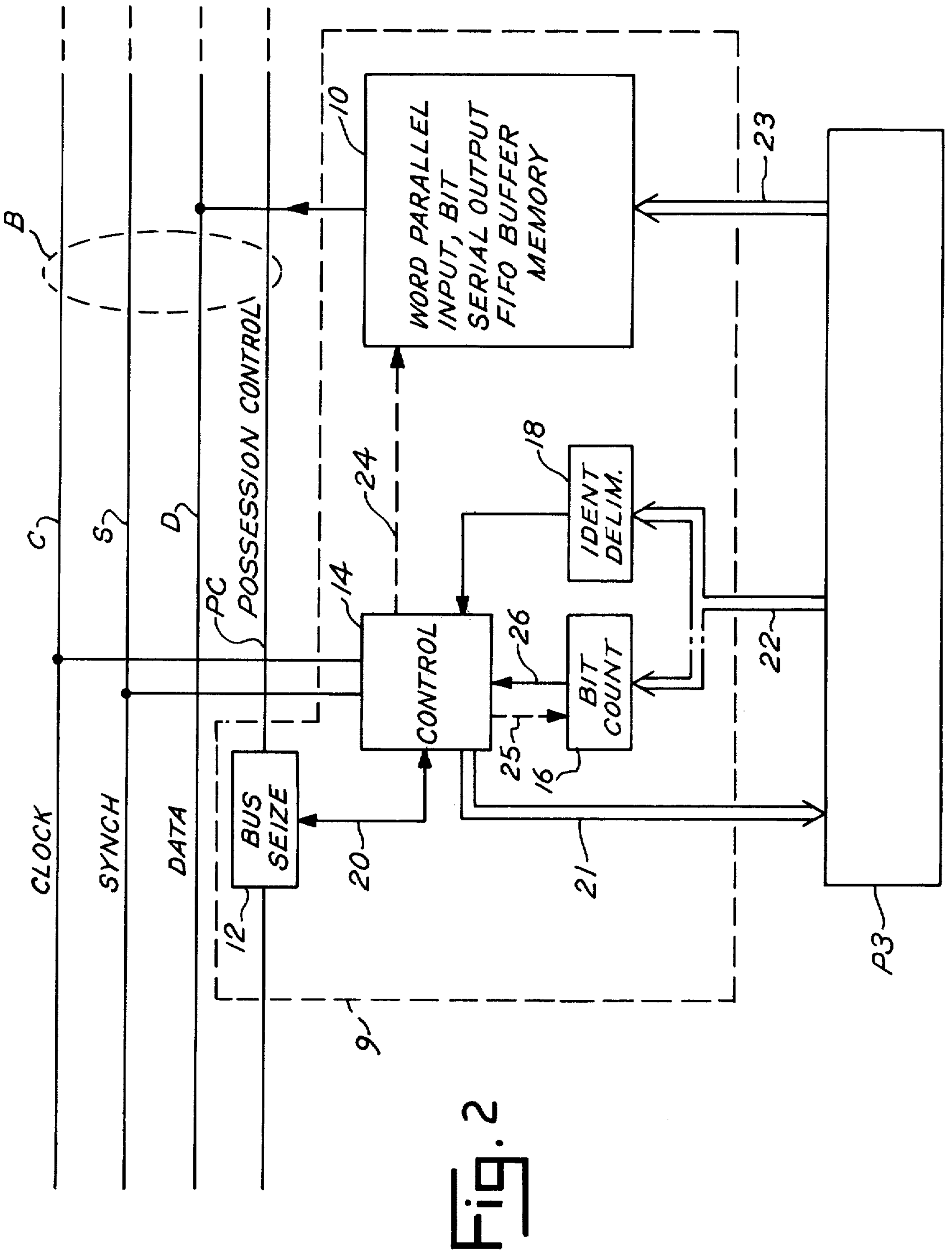
FIG. 2 is an electrical schematic drawing of a preferred form of transmitter made in accordance with the present invention.

Referring to FIG. 2, bus B comprises a clock line C, a synch line S, a data line D, and a possession control line PC.

Referring to FIGS. 1 and 2, processor unit P3 is a sending device capable of transmitting data to resource units R1 and R2. Interface SI3 of unit P3 includes a transmitter 9 comprising a buffer memory 10, a bus seize control circuit 12, a transmitting control circuit 14, a bit count register 16, and an identification delimitor register 18. The foregoing components are interconnected by cables 20–26 as shown.

Processor unit P3, as well as all other units capable of originating bus transmissions, have connections to the PC line to guarantee that only one sending device transmits at a time. Messages on data line D consist of an identification signal which identifies the units to receive a message, and a subsequent data signal transmitted to those units. The identification signal is variable bit length up to a bit maximum, and the data signal is a bit string of arbitrary length.

Data is prepared for transmission in the sending device (processor unit P3 in this case) by linking the identification signal with the associated data signal and storing them in buffer memory 10. Processor unit P3 then places the sum of the bits in the identification signal and data signal combined in bit count register 16 and places the number of bits in the identification signal alone in identification delimitor register 18. Upon receiving control of the bus through bus seize circuit 12, transmitter 9 (FIG. 2) begins to transmit clock, synch, and identification signals on lines C, S and D, respectively.

Figure 4:
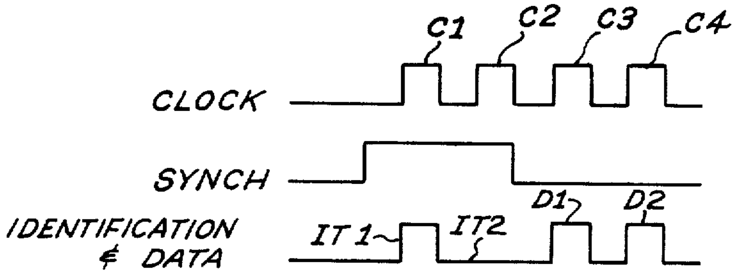
FIG. 4 describes the signal waveforms appearing on the bus when an exemplary genus identification signal alone is transmitted.

In the example shown in FIG. 4, the transmitted signal comprises a two-bit genus identification signal and a two-bit data signal. The genus identification signal has a most significant bit IT1 equal to 1 and a least significant bit IT2 equal to 0. The data signal has a most significant bit D1 equal to 1 and a least significant bit D2 equal to 1.

Figure 5:
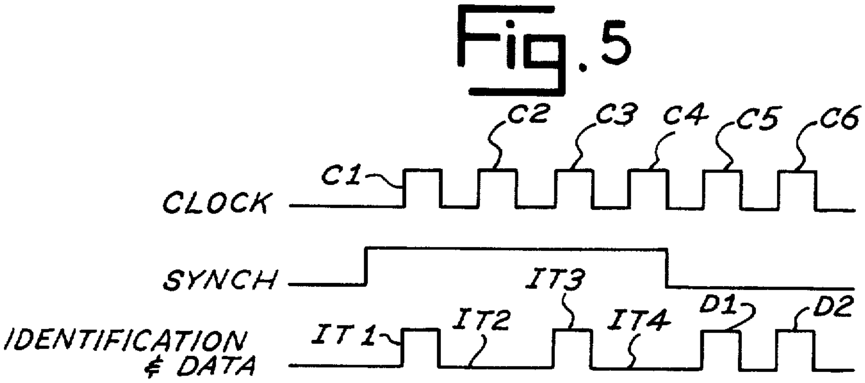
FIG. 5 describes the signal waveforms appearing on the bus when both exemplary genus and species identification signals are transmitted.

In the example shown in FIG. 5, the transmitted signal comprises a two-bit genus identification signal, a two-bit species identification signal and a two-bit data signal. The genus identification signal has a most significant bit IT1 equal to 1 and a least significant bit IT2 equal to 0. The species identification signal has a most significant bit IT3 equal to 1 and a least significant bit IT4 equal to 0. The data signal has a most significant bit D1 equal to 1 and a least significant bit D2 equal to 1.

The bits of the identification and data signals are transmitted one-at-a-time on line D from left to right as they appear in FIGS. 4 and 5. As shown in FIGS. 4 and 5, each bit is transmitted from memory 10 in synchronism with a clock pulse. During each clock pulse, the numbers represented in registers 16 and 18 are reduced by 1. When delimitor register 18 is 0, all identification signal bits have been transmitted, and the synch line S is set to a logical 0 state. During the succeeding clock pulses, data signals D1 and D2 are transmitted on line D.

Figure 3:
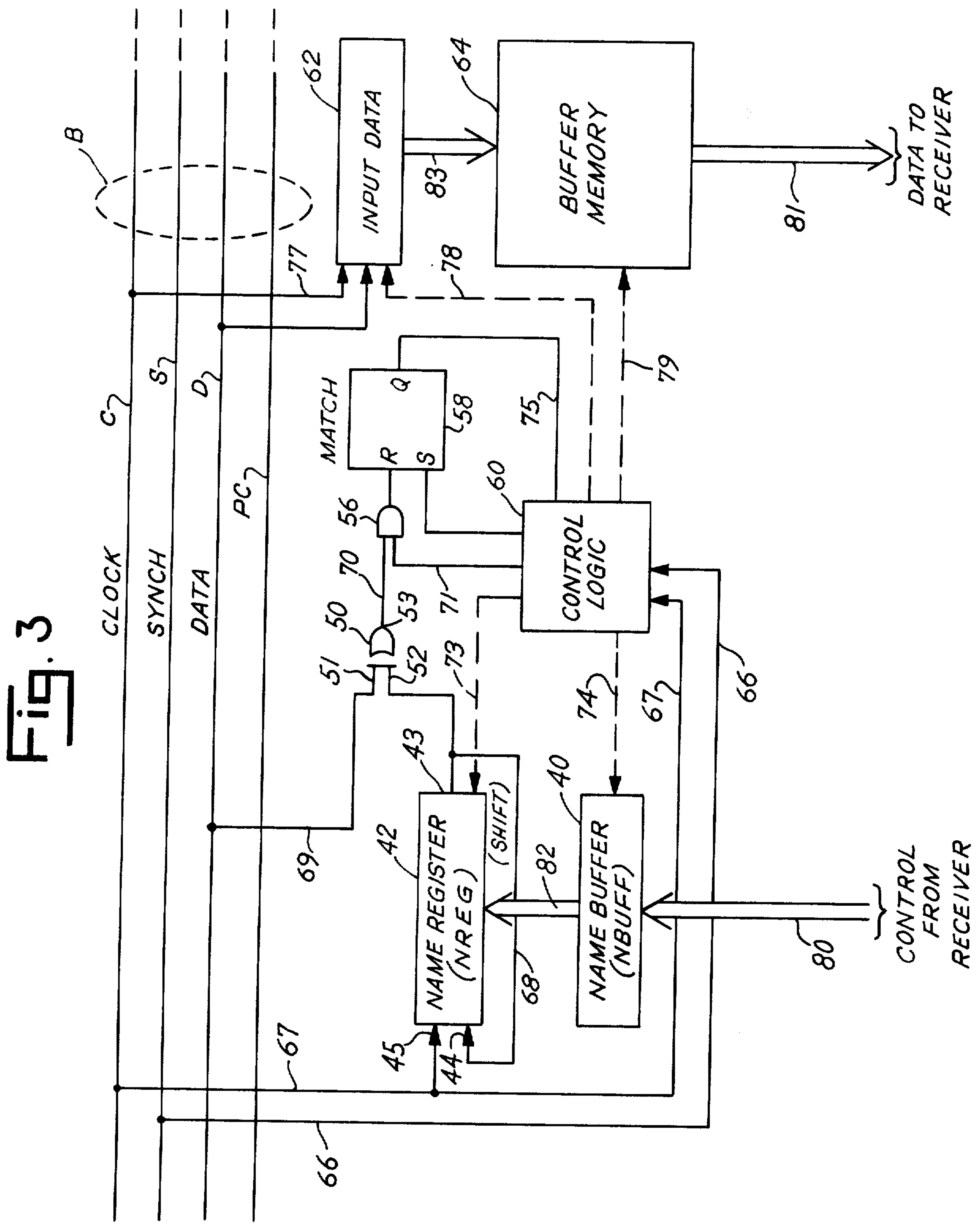
FIG. 3 is an electrical schematic drawing of a preferred form of receiver made in accordance with the present invention.

Resource units R1 and R2 act as receiving devices and each contains a receiver of the type shown in FIG. 3. Each receiver comprises a 4-bit name buffer register 40 and a 4-bit name shift register 42, having an output terminal 43, a data input 44 and a clock input 45. Pulses are shifted from register 42 to an exclusive OR gate 50 having inputs 51, 52 and an output 57 connected to a conductor 70. A logical AND gate 56 controls the logic state of the reset (R) input of a match flipflop 58 having a set input (S) and an output Q. The operation of the receiver is coordinated by a control logic circuit 60. Data pulses are accepted from line D by a conventional input data register 62 and a buffer memory 64. The receiver is interconnected in the manner shown by cables 66–83.

In unit R1, registers 40 and 42 are loaded with binary logic states 0101 in which the right hand bit (1) is the most significant and the left hand bit (0) is the least significant. In unit R2, registers 40 and 42 are loaded with binary logic states 0001 in which the right hand bit (1) is the most significant and the left hand bit (0) is the least significant. As a result, registers 40 and 42 in each of units R1 and R2 are loaded with a genus identification signal consisting of the two most significant (right most) bits. In this example, these bits are identical in each register (i.e., 01). Registers 40 and 42 in unit R1 also are loaded with a species identification signal consisting of the two least significant (left most) bits (i.e., 01), and registers 40 and 42 of unit R2 are loaded with a different species identification signal consisting of the two least significant (left most) bits (i.e., 00).

The operation of the receiver shown in FIG. 3 may be summarized as follows. The resource unit associated with the receiver (R1 or R2) enters the genus and species identification signals in name buffer register 40 prior to the beginning of transmission by transmitter 9. Buffer register 40 is used in order to prevent a change in the identification signals from altering the acceptance or rejection of data during any one operating cycle.

When the receiver senses a 0 to 1 transition on synch line S, it transfers the genus and species identification signals from register 40 to register 42, sets match flipflop 58, and begins comparing the incoming identification pulses on line D with the identification signals stored in register 42, most significant (right most) bit first. As each clock pulse is received, shift register 42 shifts the right most bit from output 43 to input 44. As the bit is shifted, it is compared with a corresponding identification pulse received on line D (e.g., IT1). If any identification pulse on line D does not match the corresponding identification bit from register 42, match flipflop 58 is reset.

If match flipflop 58 is still set when synch line S makes a 1 to 0 transition, all subsequent incoming data pulses (e.g., D1 and D2) are assembled into words and placed in a queue in buffer memory 64 for the resource unit to pick up. If match flipflop 58 is not set when synch line S makes a 1 to 0 transition, the receiver rejects subsequent data pulses (e.g., D1 and D2) and waits for another 0 to 1 transition of synch line S, indicating that another set of identification pulses is being transmitted. As a result of this process, in the examples shown in FIGS. 4 and 5, data pulses D1 and D2 are received by resource unit R1 and are not received by resource unit R2.

The operation of the receiver shown in FIG. 3 and located in unit R1 will now be described in more detail assuming that the pulses shown in FIG. 4 are transmitted on bus B. As soon as clock pulse C1 is received by the receiver, the most significant (right hand) genus identification bit in shift register 42 is shifted from output 43 through cable 68 to input 44 and to input 52 of gate 50. At the same time, identification pulse IT1 is transmitted over cable 69 to input 51 of gate 50. Identification pulse IT1, which in this example is a logical 1, and the right hand bit in register 42, which in this example is also a logical 1, are compared by exclusive OR gate 50. Since both of the bits on inputs 51 and 52 are identical, the output on cable 70 is 0, and match flipflop 58 is not reset. As soon as clock pulse C2 is received on line C, identification pulse IT2 is transmitted to input 51 and the second most significant genus identification bit stored in register 42 is transmitted to input 52. Since the pulse and the bit are both 0, output 70 is 0, and match flipflop 58 again is not reset.

On the trailing edge of clock pulse C2, synch line S returns to 0, and control logic 60 then sets match flipflop 58 (whether it needs setting or not). At the same time, input data register 62 is gated to accept data pulses D1 and D2 which are subsequently transmitted over cable 83 to buffer memory 64 by well known techniques. The data signals are stored in memory 64 until the unit R1 is ready to accept and process the data.

Since the genus identification bits stored in the name buffer registers of units R1 and R2 are identical, the same mode of operation is achieved by the receiver in unit R2. As a result, both units R1 and R2 accept data bits D1 and D2 for storage and subsequent processing.

If the pulses shown in FIG. 5 are transmitted on bus B, the operation during clock pulses C1 and C2 is identical to the operation described in connection with FIG. 4. Since the bits of the species identification signal stored in the name register in unit R1 (i.e., 01) correspond to pulses IT3 and IT4, match flipflop 58 in unit R1 is not reset as clock pulses C3 and C4 are transmitted. During clock pulses C5 and C6, after the synch line S returns to 0, data bits D1 and D2 are accepted and stored in buffer memory 64 of unit R1.

In unit R2, the bits of the second species identification signal stored in register 42 (i.e., 0, 0) do not correspond to identification pulses IT3 and IT4. More specifically, identification pulse IT3 is a logical 1 whereas the corresponding bit of the second species signal stored in register 42 of unit R2 is a logical 0. As soon as receiving unit R2 receives clock pulse C3, a logical 1 pulse is transmitted to input 51 and a logical 0 pulse is transmitted to input 52 of exclusive OR gate 50 in unit R2. As a result, cable 70 is switched to a logical 1 state and match flipflop 58 in unit R2 is reset so that the Q output is switched to its 0 state. As soon as the synch signal returns to the 0 state at the end of clock pulse C4, data pulses D1 and D2 are prevented from entering input data register 62 in unit R2 so that the unit R2 rejects the data, whereas unit R1 accepted data pulses D1 and D2.

Of course, if the species identification signal for unit R2 (0, 0) is transmitted during clock pulses C3 and C4, unit R2 will accept data pulses D1 and D2 and unit R1 will reject the data pulses.

In the foregoing system, hierarchical addressing is intentionally allowed. For example, the most significant (right most) field in register 42, the genus identification signal, may specify a logical process which is associated with both units R1 and R2, and the next most significant field, the species identification signal, may specify another classification, etc. down to the subroutine level. In this way, a short number of identification pulses transmitted on line D would specify that the following data is to be received by many units, whereas additional identification pulses on line D may result in the receipt of the data pulses by only one unit.

Those skilled in the art will recognize that the preferred embodiment shown herein may be altered and modified without departing from the true spirit and scope of the invention as defined in the accompanying claims. For example, units R1 and R2 may also be processor units having both computational and memory capability. In addition, each of the units shown in FIG. 1 may contain both a transmitter of the type shown in FIG. 2 and a receiver of the type shown in FIG. 3, so that all units have both sending and receiving capability.

What is claimed is:

1. In a data processing system including a first receiving device, a second receiving device and a sending device interconnected by a bus, improved apparatus for transmitting data from the sending device to the first and second receiving devices comprising:

transmitting means in the sending device for transmitting on the bus during a first time period a genus identification signal generic to the first and second receiving devices followed by a first data signal so that the first data signal can be received by both the first and second receiving devices, for transmitting on the bus during a second time period the genus identification signal and a first species identification signal specific to the first receiving device followed by a second data signal so that the second data signal can be received only by the first receiving device, and for transmitting on the bus during a third time period the genus identification signal and a second species identification signal specific to the second receiving device followed by a third data signal so that the third data signal can be received only by the second receiving device;

first data receiving means in the first receiving device responsive to the genus identification signal on the bus and the absence of the first and second species identification signals on the bus for accepting the first data signal from the bus, responsive to the combination of the genus and first species identification signals on the bus for accepting the second data signal from the bus and responsive to the combination of the genus and second species identification signals on the bus for rejecting the third data signal on the bus; and second data receiving means in the second receiving device responsive to the genus identification signal on the bus and the absence of the first and second species identification signals on the bus for accepting the first data signal from the bus, responsive to the combination of the genus and the first species identification signals on the bus for rejecting the second data signal on the bus and responsive to the combination of the genus and second species identification signals on the bus for accepting the third data signal from the bus, whereby the sending device can transmit data to the first and second receiving devices by transmitting a genus identification signal which is used as part of the identification signals required to transmit data to the first or second receiving devices individually.

2. Apparatus, as claimed in claim 1, wherein the sending device comprises a data processor having memory and computational ability.

3. Apparatus, as claimed in claim 2, wherein the first and the second receiving devices each comprise a data processor having memory and computational ability.

4. Apparatus, as claimed in claim 1, wherein the transmitting means comprises synchronizing means for transmitting on the bus a synchronizing signal which identifies the end of one said identification signals and the beginning of one of said data signals.

5. Apparatus, as claimed in claim 4, wherein the transmitting means comprises serial means for transmitting the identification signals and the data signals serially one bit at a time.

6. Apparatus, as claimed in claim 5, wherein the serial means comprises:

a first register for storing one of said identification signals;

a counter for storing a counter signal representing the number of bits in said one identification signal stored in the first register;

control means for reducing the number of bits represented by the counter signal each time a bit of the identification signal stored in the first register is transmitted on the bus; and means for causing the synchronizing means to transmit the synchronizing signal on the bus when the counter signal represents a predetermined number of bits.

7. Apparatus, as claimed in claim 1, wherein the first data receiving means comprises:

a name register for storing one of said identification signals;

comparison means for generating a match signal when the identification signal transmitted on the bus matches the identification signal stored in the name register; and means for accepting the data signal transmitted on the bus following the transmission on the bus of the identification signal stored in the name register.

8. Apparatus, as claimed in claim 7, wherein the name register comprises a shift register having an output terminal for successively shifting a bit of the identification signal stored in the shift register to the output terminal each time a bit of the identification signal is transmitted on the bus, and wherein said comparison means comprises:

an exclusive OR gate having a first input operatively connected to the output terminal, a second input connected to the bus and also having an output; and a flipflop circuit having an input connected to the output of the exclusive OR gate whereby the flipflop is set to a predetermined state if the identification signal transmitted in the bus matches the identification signal stored in the shift register.

* * * * *